Patented Aug. 18, 1925.

1,550,035

UNITED STATES PATENT OFFICE.

JOHN LEWIS, OF LONDON, ENGLAND, ASSIGNOR TO LAMINA LIMITED, OF LONDON, ENGLAND.

CATTLE AND POULTRY FOOD FROM FISH REFUSE.

No Drawing.   Application filed May 20, 1924.   Serial No. 714,539.

*To all whom it may concern:*

Be it known that I, JOHN LEWIS, residing in London, England, a subject of the King of Great Britain and Ireland, have invented certain new and useful Improvements in Cattle and Poultry Foods from Fish Refuse, of which the following is a specification.

This invention relates to the preparation of cattle and poultry food products from fish offal and to the processes employed for the manufacture thereof of the type in which fish offal, suitably prepared is dried in a stream of dry air or other gas, and is then ground to a fine meal, with or without extraction of oil from the undried fish, and with or without injection of flavouring essences for their antiseptic properties and to prevent or mask rancidity. The object of this invention is to provide a process for the manufacture of an improved food for cattle or poultry.

According to this invention, I disintegrate the fish offal, after suitable cleaning, and extract the oil and some of the moisture by centrifuging the material and simultaneously treating it with steam by injecting the steam into the material under treatment, using preferably wet steam at 230° F. The material so treated is subsequently dried in a current of pure, dry, air at a suitable temperature, which is passed through the dryer in such a manner that the dry air first meets the material where it is wettest and is led over or through the material once only, in order to avoid that impurities which have been extracted by the current of air are not deposited again, as would occur if the air were led again over or through the material. The finished product is adapted for use as a cattle or poultry food.

In conjunction with the above process, I propose, in some cases to inject a fine spray of wood creosote or oil of nutmeg into the dryer with the dry air.

As an example of one method of carrying out this invention the following may be given, applicable in this case to surplus whole fish. The eyes, gills, teeth, and blood of the fish are removed by any known or any convenient process, and the material is then passed through a cleansing tank and washed free of slime and other impurities, and conveyed to a pulverizer which breaks it up into a conglomerate mass, and releases the oil. From the pulverizer this mass falls by gravity into a centrifugal extractor of suitable form, revolving at, say, 800 revolutions per minute, and is treated by injecting wet steam at about 250° F. into the material, and by the combined action of the steam and the centrifugal action about thirty-five per cent of oil and moisture is extracted from the material.

The material is then conveyed to a single shell rotary dryer fitted with sinuous lifts in which it is very thoroughly agitated and through which it passes in about thirty-five or forty minutes, and it is exposed in the dryer to a current of pure dry air heated to approximately 350° F., whereby about thirty-five per cent of the moisture is extracted. The air is heated in a heater of a type which allows a high temperature to be attained at low pressure, say about 5 lbs. per square inch above that of the atmosphere, and which does not bring the heated air into contact with metal while it is being heated.

After the material has passed through the dryer it is passed to a screening apparatus of, say, one-eighth of an inch mesh, while the balance which fails to pass this mesh is ground to the fineness of sand. During the process of elevation to the screens a current of cold air is passed through the material to cool it, this treatment having the effect of composing the material and giving it the property of keeping for a long period of time.

I have found it advantageous to make a fine injection of wood creosote or essence of nutmeg into the dryer with the dry air; this has useful properties as a preservative and improves the flavour.

The finished product is of an ivory colour, and has a pleasant flavour and smell, and only contains a small percentage of oil, while it is very rich in albuminoids. About a ton of finished product is obtained from four tons of raw fish.

What I claim and desire to secure by Letters Patent is:—

1. A process of the type described, characterized in that the fish offal, after cleaning, is disintegrated and is then centrifuged and simultaneously treated by injecting steam into the material, which is then dried in a current of pure dry hot air.

2. A process as claimed in claim 1, further characterized in that the current of air is led over or through the material once only in such a manner that the driest and hottest air encounters the wettest parts of the said material.

3. A process of the type described, characterized in that the fish offal after cleansing is disintegrated and is then centrifuged and simultaneously treated by injecting steam into the material which is then dried in a current of pure dry air at approximately 350 degrees F.

4. A process as claimed in claim 3, further characterized in that the current of air is led over or through the material once only, in such a manner that the driest and hottest air encounters the wettest parts of said material.

5. A process as claimed in claim 1, further characterized in that the material after drying is screened and is cooled by treatment with a current of cold air for the purpose set forth.

6. A process as claimed in claim 1, further characterized in that the current of air is led over or through the material once only, in such a manner that the driest and hottest air encounters the wettest parts of said material, screening the material after it is dried and cooling the material with a current of cold air.

7. A process as claimed in claim 3, further characterized in that the material after drying is screened and is cooled by treatment with a current of cold air for the purpose set forth.

In testimony whereof, I affix my signature.

JOHN LEWIS.